May 4, 1965     E. KOHRING     3,181,400
TWO SPEED POWER TOOL TRANSMISSION
Filed Dec. 4, 1962
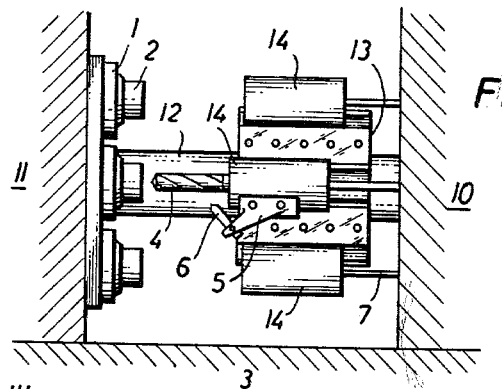
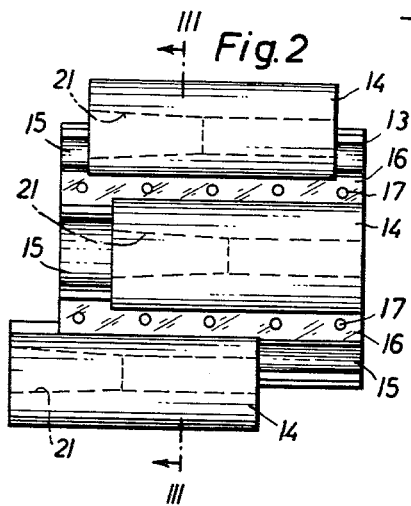
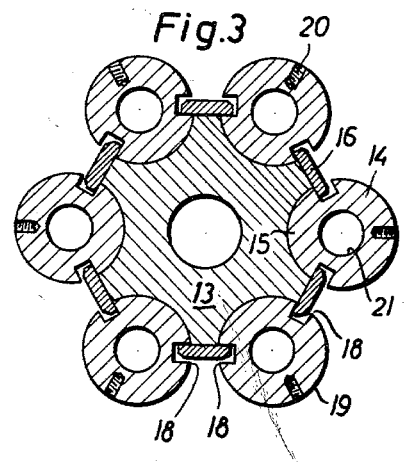
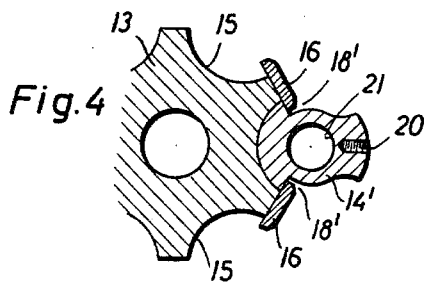
INVENTOR
Erwin Kohring
BY
Richard End
Agt

United States Patent Office 3,181,400
Patented May 4, 1965

3,181,400
TWO SPEED POWER TOOL TRANSMISSION
Erwin Kohring, 11 Sieglarer Strasse,
Cologne-Poll, Germany
Filed Dec. 4, 1962, Ser. No. 242,200
3 Claims. (Cl. 82—25)

This invention relates to a tool slide arrangement for a machine tool, and more particularly to means for guiding the axial movement of tool slides on automatic multiple spindle lathes and the like.

In a known tool slide arrangement, the axially movable tool slides are mounted on a common carrier. They are guided for axial movement toward and away from the work spindles by engagement of dovetailed or prismatic grooves and rails. Such a guide arrangement is relatively difficult to build to the precision requirements for this type of machine tools. The problem of combining close tolerances with a reasonably simple method of manufacturing the slide carrier and the slides has only been partly solved by replacement of the dovetailed or prismatic guide means by conforming elements of circular cross section in a plane perpendicular to the direction of slide movement. Such slides retain two sources of dimensional error in the contact face of the slide which engages the guide groove of the slide carrier, and in the exposed face outside the groove on which a tool holder is mounted. Dimensional errors in the location of these faces may be additive.

The primary object of this invention is the provision of a tool slide arrangement for guiding axial movement of multiple tool slides in a machine tool of the type described, in which precise guiding of each slide can be achieved in a simple and relatively inexpensive manner.

Another object is a tool slide arrangement in which the several slides occupy a minimum of space, and can therefore be located relatively closely adjacent each other.

With these and other objects in view, the invention in its more specific aspects contemplates providing a tool slide carrier with a plurality of circumferentially spaced open grooves elongated in a common direction. Each groove has a bottom face or wall of a substantially circular arc shape and receives a tool slide which is slidable in the groove in an axial direction. A contact face on the tool slide conformingly engages the cylindrical bottom wall of the groove so that the bottom wall and the contact face are partly axially coextensive. An exposed face of the tool slide outside the groove forms together with the contact face a substantially cylindrical surface and is equipped with mounting means for mounting a tool thereon. Since the contact face and the exposed face of the tool slide are readily formed in a single machining operation to narrow tolerances, there is only a single source of dimensional error, and this source is relatively easily and inexpensively controlled.

Other features and many of the attendant advantages of this invention will be readily appreciated as the same becomes better understood by reference to the following detailed description of a preferred embodiment when considered in connection with the accompanying drawing wherein:

FIG. 1 shows the working area of a six-spindle automatic machine tool in side elevation;

FIG. 2 shows a slide carrier and the tool slides of the apparatus of FIG. 1 on an enlarged scale;

FIG. 3 is a front elevational sectional view of the device of FIG. 2 taken on the line III—III; and FIG. 4 illustrates the slide carrier of FIG. 3 equipped with a modified tool slide.

Referring initially to FIG. 1, there is seen the working area of a six-spindle automatic lathe of largely conventional design, and illustrated only to the extent necessary to show the cooperation of the tool slide carrier and of the tool slides of this invention with the remainder of the machine tool.

The working area is defined in a horizontal direction by a housing 10 enclosing the mechanism for actuating movement of the tool slides and by a housing 11 enclosing the mechanism for indexing the six work spindles 1 and for rotating them about their axes. Each spindle holds a work piece 2. The working area of the lathe extends above the lathe bed 3. The mechanisms enclosed in the housings 10, 11 are connected by a central shaft 12 in a known manner.

A slide carrier 13 is secured on the shaft 12 against rotation and axial movement in a manner not further illustrated. Six tool slides 14 equiangularly spaced about the axis of the shaft 12 are axially slidable on the carrier 13 in respective axially elongated radially open grooves 15. The bottom walls of these grooves are formed by cylindrically concave faces of the slide carrier 13 as best seen in FIG. 3.

The tool slides 14 shown in FIG. 3 are substantially cylindrical bodies coaxial with the corresponding grooves 15 in which they are conformingly inserted. Two axially elongated recesses 18 in the outer cylindrical face of each slide 14 circumferentially divide that face into two portions. A minor contact face portion conformingly engages the bottom wall of the respective groove 15 whereas the axially coextensive major portion 19 of the cylindrical face is exposed outside the groove 15.

Elongated caps 16 engaging plane faces of the slide carrier 13 between each pair of adjacent grooves extend into the recesses 18 of the two adjacent tool slides so as to secure them against movement radially outward of the respective groove, while permitting axial sliding movement. The caps 16 are secured to the slide carrier 13 by screws 17 which are seen in FIGS. 1 and 2 and have been omitted from the showing of FIGS. 3 and 4 for the sake of clarity.

The exposed major cylindrical face portions 19 of the slides 14 have blind tapped holes 20 extending radially inward. Each tool slide 14 also has an axial central bore 21 which flares conically toward a radially extending end face of the slide 14 (see FIG. 2). The conical portion of each of the bores 21 may receive a tool such as a drill bit 4. A tool holder 5 for a cutting bit 6 is attached to the exposed face portion 19 of a tool slide 14 by screws threadedly engaging the tapped holes 20.

The apparatus illustrated in FIGS. 1 to 3 operates in a manner evident to those skilled in the art. The axial movement of the several tool slides 14 on the carrier 13 is actuated by the mechanism contained within the housing 10 of which only drive rods 7 connected to the several tool slides 14 are visible in FIG. 1.

FIG. 4 shows the slide carrier 13 of FIG. 3 equipped with a modified tool slide 14' which differs from the slides 14 by the circumferential widths of the recesses engaged by the retaining caps 16. The recesses 18' seen in FIG. 4 extend circumferentially toward the tapped hole 20 to such an extent that the remaining part of the exposed cylindrical surface of the tool slide 14' is circumferentially narrower than the contact face portion engaging the tool carrier 13 in the groove 15. The tool slide 14' is substantially lighter in weight than the tool slide 14 under otherwise similar conditions, and may be preferred for this reason in suitable applications.

The circularly arcuate concentric sectional shapes of the tool slide faces which respectively serve as a guide face making contact with the slide carrier and as a mounting face for attaching tools permit the most important dimensions of the tool slide to be controlled with high precision in a simple manner. The sources of error are reduced in number and importance, and the tool slides may be made to very close tolerances at relatively low cost. The cylindrical overall shape of the tool slides makes the slides very rigid and improves the stability of the machine tool. The moment of resistance to deformation is particularly high with cylindrical tool slides of the type disclosed.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:
1. In a machine tool,
   (a) a tool slide carrier having an axis and being formed with a plurality of open grooves extending parallel to said axis, each groove being defined by a wall representing a portion of a substantially cylindrical wall,
   (b) at least a single solid tool slide received in at least a portion of one of said grooves for sliding movements in said one groove, said tool slide being provided with a centrally extending bore to receive at one end thereof a tool, and having a surface including
      (1) a contact face, and
      (2) an exposed face, said contact face conforming to and slidingly engaging the groove-defining wall of said one groove, said contact and exposed faces forming, when viewed in cross-section, parts of a substantially circular line including the substantially circular arc of said contact face,
   (c) means for mounting a tool on said exposed face, and
   (d) means for slidably retaining said tool slide in said one groove.
2. The machine tool according to claim 1, wherein said tool slide carrier is of elongated shape, said grooves extend longitudinally and are circumferentially spaced, said tool slide is of substantially cylindrical shape, and said contact and exposed faces form the cylindrical surface of said tool slide.
3. In the machine tool according to claim 1, a portion of said bore at said one end being conical.

References Cited by the Examiner
UNITED STATES PATENTS

| | | | |
|---|---|---|---|
| 1,274,436 | 8/18 | Murphy et al. | 29—52 |
| 1,318,116 | 10/19 | Smith | 29—52 |

FOREIGN PATENTS

| | | |
|---|---|---|
| 754,610 | 8/53 | Germany. |

ANDREW R. JUHASZ, *Primary Examiner.*
WILLIAM W. DYER, Jr., *Examiner.*